Aug. 25, 1931.  H. P. HIPPEE  1,820,070
REFRIGERATOR
Filed Nov. 5, 1928   2 Sheets-Sheet 2
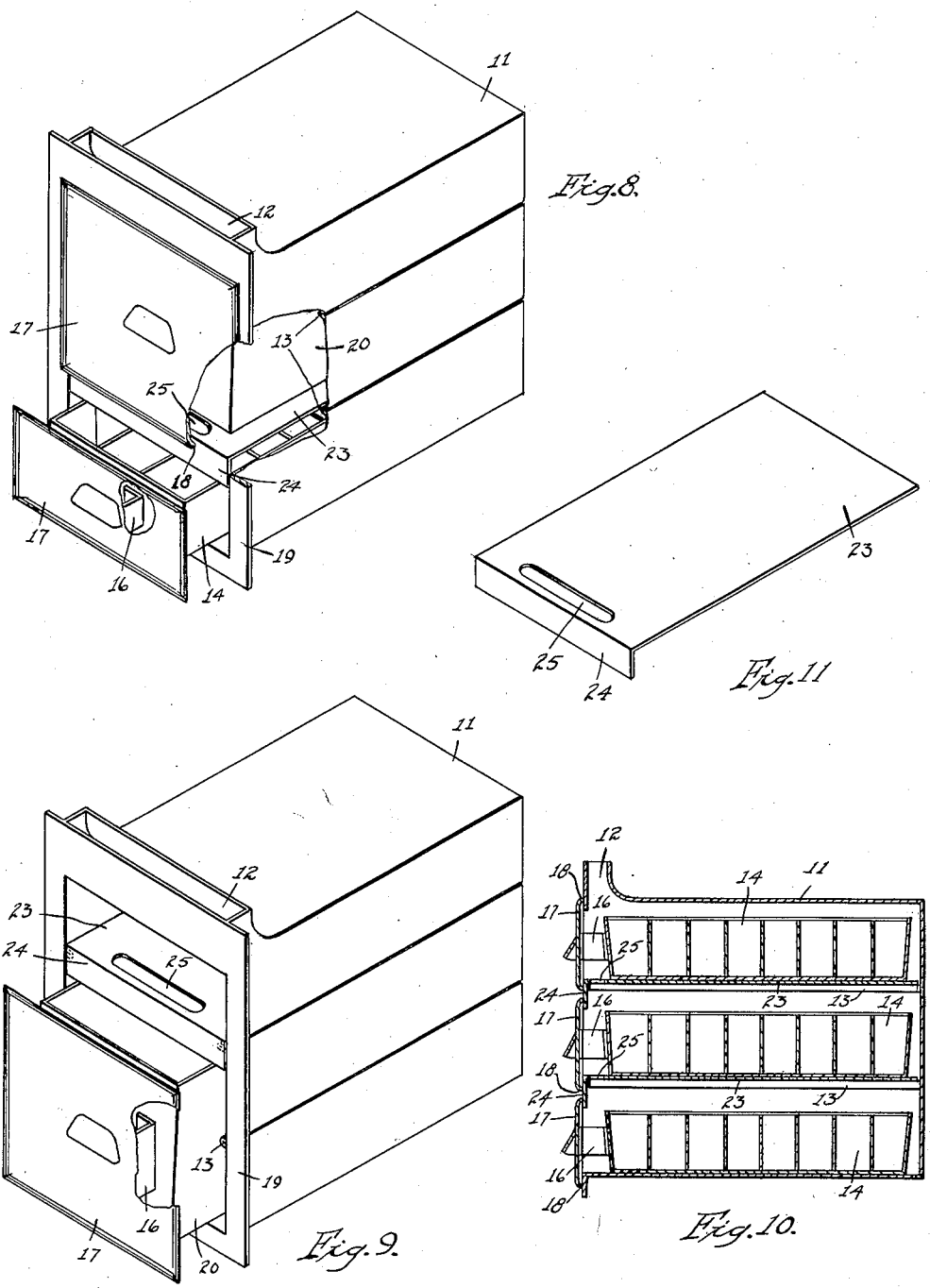
Inventor
Herndon P. Hippee
by Orwig & Hague Attorneys.

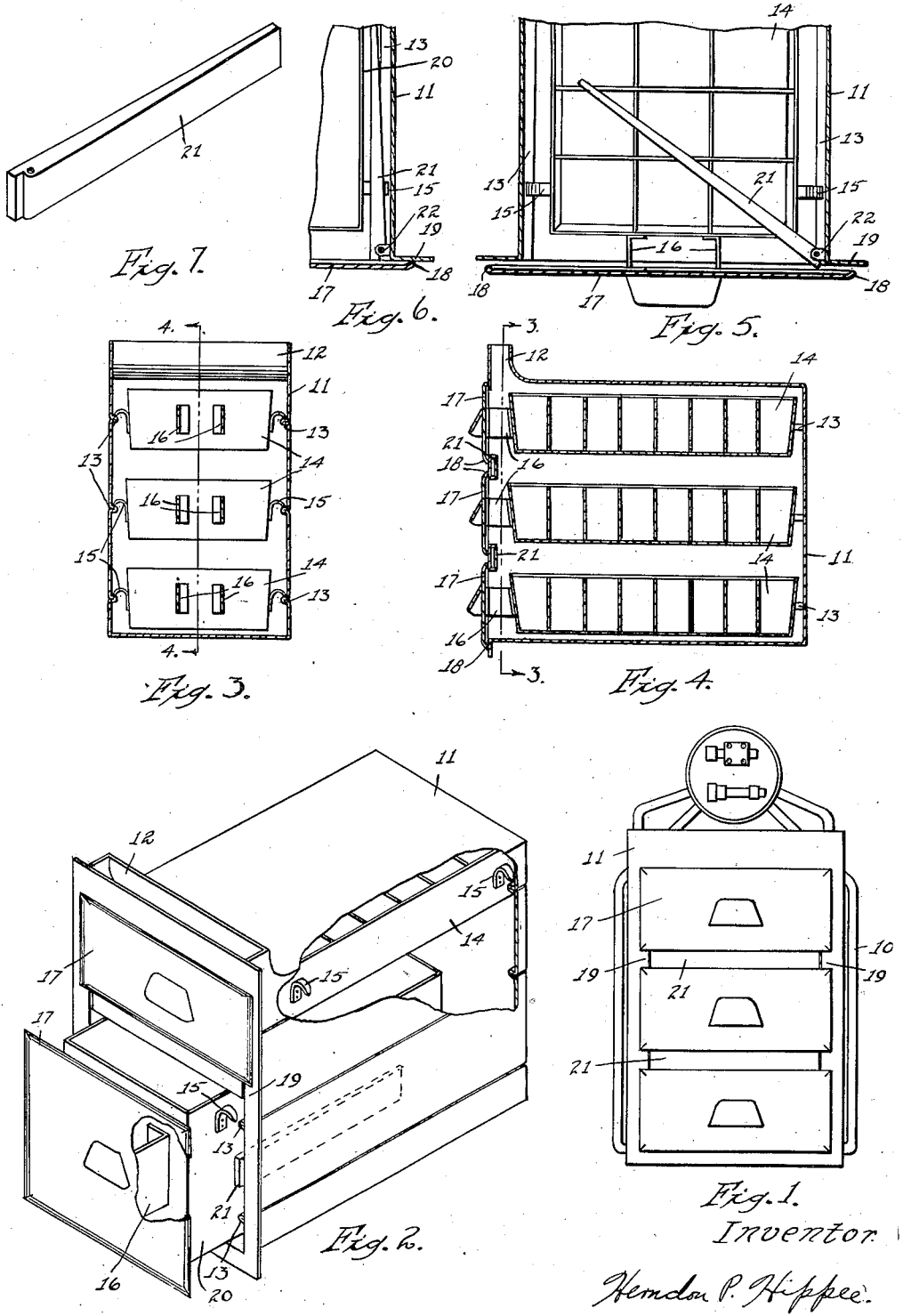

Patented Aug. 25, 1931

1,820,070

UNITED STATES PATENT OFFICE

HERNDON P. HIPPEE, OF DES MOINES, IOWA; MARGUERITE B. HIPPEE, ADMINISTRATRIX OF SAID HERNDON P. HIPPEE, DECEASED, ASSIGNOR TO FRIGIDAIRE CORPORATION, OF DAYTON, OHIO, A CORPORATION OF DELAWARE

REFRIGERATOR

Application filed November 5, 1928. Serial No. 317,426.

My invention relates to that class of refrigerators in which there is employed a refrigerating coil and a series of trays removably placed in the freezing chamber.

The objects of my invention are to provide means of simple, durable and inexpensive construction for facilitating the removal of heat from the interior of the freezing chamber and the trays and materials contained therein, and at the same time to prevent the entrance of heat, to thereby reduce the time required for freezing the contents of the freezing chamber, and to effect an economy in the operation of the refrigerator.

A further object is to provide a simple, durable and inexpensive means whereby the trays may be readily and easily removed from the freezing chamber after the contents of the trays have been frozen.

A further object is to provide means of simple, durable and inexpensive construction for closing the gaps between the tray front panels either when shallow freezing trays or deep freezing trays are inserted in the freezing chamber.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of a refrigerating coil, a freezing chamber mounted therein, and a series of trays in the freezing chamber.

Figure 2 shows an isometric view of a freezing chamber and a series of trays mounted therein, parts being broken away to show the interior construction.

Figure 3 shows a vertical, transverse, sectional view taken on the line 3—3 of Figure 4.

Figure 4 shows a vertical longitudinal, sectional view taken on the line 4—4 of Figure 3.

Figure 5 shows a horizontal sectional view of a part of the freezing chamber and a freezing tray therein, and illustrating the movable front closure member in a rearwardly tilted position.

Figure 6 shows a horizontal, detail, sectional view illustrating the position of the pivoted front sealing member when moved to position substantially parallel with a side wall of the freezing chamber.

Figure 7 shows a detail isometric view of one of the pivoted front sealing members.

Figure 8 shows an isometric view of a freezing chamber having a deep freezing tray and a shallow freezing tray at the bottom, and illustrating a modified form of the device for closing the gap between the freezing tray panels.

Figure 9 shows a similar view showing the deep freezing tray at the bottom and the same form of gap closing means at the top of the freezing chamber.

Figure 10 shows a vertical, longitudinal, sectional view of a freezing chamber having therein three shallow trays and my improved modified form of means for closing the gaps between the front panels of the freezing trays; and Figure 11 shows an isometric view of the modified form of device for closing the gaps between the freezing tray panels.

Referring to the accompanying drawings, I have used the reference numeral 10 to indicate generally the refrigerator coil. Mounted within the refrigerator coil is a metallic refrigerating chamber 11 open at its front only.

At the front top portion of the refrigerating chamber there is a flue 12 with its upper end open and extended above the top of the chamber, and its lower end communicating with the interior of the chamber. At the sides of the freezing chamber there are horizontally arranged tray supporting ribs 13.

The trays proper are of the ordinary construction and are indicated generally by the reference numeral 14. Each tray has at each side two tray supporting and guiding devices 15 each of which is secured to the tray and then is extended upwardly and outwardly and downwardly, and is so arranged that its outer end only will engage the top of the rib 13.

At the front of each tray there are two forwardly extended brackets 16 fixed to the tray and having fixed to their front ends a front plate 17, which is spaced apart from the front of the tray to which it is attached. The edges of this front plate 17 are all curved or inclined rearwardly or toward the freezing chamber, as indicated at 18, so that when the tray is in position within the the freezing chamber, this narrow edge only will contact with the front or face of the freezing chamber indicated by the numeral 19.

Freezing trays for freezing ice cubes are usually formed shallow and have partitions, as indicated in the drawings. In addition to this refrigerating devices are customarily supplied with a tray without partitions and of considerably greater depth than the trays for the ice cubes, such as indicated at 20 in Figure 2, and when it is desired to use one of the deep trays 20, two of the trays for forming ice cubes are removed and a large tray 20 is placed in position within the freezing chamber formerly occupied by the two small trays.

For the purpose of forming a substantially air tight closure for the front of the freezing chamber when the trays are in position, to prevent the entrance of heat, and to provide a structure of this kind in which one large tray may be substituted for two small ones, I have provided a device for sealing or closing that portion of the front of the freezing chamber between the adjacent edges of the front plates 17, and which closure devices will not interfere with the placing of a large tray in any part of the freezing chamber. This front closure member is indicated generally by the reference numeral 21, and is pivoted near one end to a lug 22 fixed to and projecting inwardly from the side of the freezing chamber adjacent to the front thereof, as shown in Figure 6, in such a manner that it may swing rearwardly as shown in Figure 6, or have its front face parallel with the front plates of the trays when in a closed position, as shown in Figure 4.

In use with this part of the device, and assuming that a large tray 20 is to be put in the lower part of the freezing chamber, then when the tray is inserted, the pivoted closure device will be moved by the tray rearwardly to the position shown in Figure 6. The other one of the pivoted closure devices, however, is positioned above the large tray and, therefore, will not be moved rearwardly and when the rear edge of the front plate 17 strikes the short end of the pivoted closure member, as shown in Figure 5, then when the tray is moved farther inwardly, the pivoted closure member will be moved thereby to position with the front of the pivoted closure member in contact with the narrow edge 18 of the tray front 17.

When placing trays full of water in the freezing chamber, it frequently happens that water is spilled, and when the trays are permitted to rest upon the flat support or shelf within the freezing chamber, this water then turns into ice and securely binds the tray to the flat support or shelf on which it rests.

In addition to this, it is well known that during the freezing process the moisture in the air condenses in the form of frost upon all of the metal of the freezing device, and particularly this frost tends to form at the points where the tray fronts engage the front of the freezing chamber, and in this connection I have observed that if there is an opening at the front of the freezing chamber of a quarter of an inch or less, this opening will become completely sealed by frost during the freezing process.

Under such conditions with the kind of trays and devices now in common use, it is at times very difficult to remove the tray because it is tightly sealed by frost to the front of the freezing chamber, and in many instances it is tightly sealed by ice to the support on which the trays are resting, and the trays and the freezing chamber are very frequently damaged and destroyed in efforts to remove the trays by use of various tools applied for the purpose of breaking the frost and ice seals.

With my improvement the trays are readily and easily removed after the contents thereof are frozen and the metal surface is not covered with frost, because where the front panel contacts with the freezing chamber, the contact is only along a thin edge and the frost along this thin edge can be readily and easily broken by simply pulling upon the front tray.

In addition to this, the sole support for the tray within the freezing chamber is the pointed ends of the supports 15 where they rest upon the ribs 13, and even though these points were frozen to the ribs by a coating of ice, the contact could be readily and easily broken by pulling upon the front of the tray, and without the use of tools which would disfigure or destroy the device.

It will be seen by reference to the drawings that the front panel, the pivoted closure device and the flue 12 all co-operate when the front is closed to prevent the entrance of the warm air to the freezing chamber from the interior of the refrigerator, and to permit the escape of heated air from the interior of the freezing chamber. Hence, these parts jointly constitute a flue structure, and the part 12 separately considered constitutes a flue.

In Figures 8 to 11 inclusive I have illustrated a modified form of that part of my invention which concerns the means for closing the gaps between the freezing tray front panels, and at the same time permits the insertion of either shallow trays or deep trays in any part of the freezing chamber.

In this form of the invention I provide a metal plate 23 of such size as to enter the interior of the freezing chamber and to be slidably supported upon the ribs 13. At its front is a closure member 24 formed integral with the plate 23, and extended downwardly, and in the plate 23 near the front is a flue opening 25.

When the freezing chamber has compartments for three shallow freezing trays, as illustrated in Figure 10, then two of these detachably closure devices are employed, as shown in Figure 10. They rest upon the ribs 13 and the freezing trays in turn rest upon the tops of the plates 23, and when the tray is fully inserted in the freezing chamber the edges of the front panels engage the closure member 24, as shown in Figure 10.

When it is desired to use a deep tray in the lower part of the freezing chamber, then the lower plate 23 is removed and the front panel of the deep tray will form a closure at the freezing tray front by engagement with the flange 19 of the freezing chamber, and the front edge of the upper closure member 24. Obviously, when it is desired to use the deep tray at the top, it is the upper plate 23 which is removed and the lower one which remains in position as shown in Figure 8.

When this form of closure device is employed, and it is desirable to maintain a flue-like structure between the front edges of the tray and the tray front panels, then I provide flue openings 25 in the plates 23, as shown in Figures 10 and 11, and which obviously permits the circulation of air from all of the trays to the flue 12 at the top of the freezing chamber.

I claim as my invention:

1. In a refrigerating apparatus, the combination of a freezing chamber open at its front, a number of trays removably supported within the freezing chamber, one of them being of much greater depth than the others, a front panel for each tray, said panels being of such size that the adjacent edges of the two panels will stand spaced apart thus forming a gap, and a front closure member supported within the freezing chamber and shaped to close the gap between two adjacent tray front panels, and also capable of being moved to a position where it will not interfere with the insertion into the freezing chamber of the deep tray at the point where the closure member is located when serving as a closure, said closure member being shaped to permit an upward circulation of air past it within the freezing chamber when it is in position for closing the gap.

2. In a refrigerating apparatus, the combination of a freezing chamber open at its front, a freezing tray removably placed within the freezing chamber, a closure member pivoted to the interior of the freezing chamber and capable of moving inwardly to a position between the side of the tray and the side of the freezing chamber, and also capable of swinging outwardly to position parallel with the front of the freezing chamber, a front panel on the tray shaped to overlap the sides of the freezing chamber and a portion of the closure member, the latter being pivoted in such position as to be engaged by the panel when the tray is being inserted and to be swung thereby to position lying flat against the adjacent portion of the panel.

3. A refrigerating element for refrigerating apparatus comprising in combination, a freezing chamber open at one end, a plurality of relatively shallow freezing trays removably placed within said chamber, said trays being normally spaced apart when located in said chamber, and means for bridging the space between said trays at the open end of said chamber, said means being movable inwardly upon the insertion into said chamber of a tray of greater depth than one of said shallow trays.

4. A refrigerating element for refrigerating apparatus comprising in combination, a freezing chamber open at one end, a plurality of relatively shallow freezing trays removably placed within said chamber, said trays being normally spaced apart when located in said chamber, and means for bridging the space between said trays at the open end of said chamber, said means being pivotally mounted on said chamber and adapted to swing into the chamber upon the insertion therein of a tray of greater depth than one of said shallow trays.

5. A refrigerating element for refrigerating apparatus comprising in combination, a freezing chamber open at one end, a plurality of relatively shallow freezing trays removably placed within said chamber, a front plate on each of said trays, said front plates being normally spaced apart when said trays are located within said chamber, and means for closing the space between the front plates of said trays, said means being movable inwardly upon insertion into said chamber of a tray of greater depth than one of said shallow trays.

HERNDON P. HIPPEE.